United States Patent
Uda et al.

(10) Patent No.: US 7,391,974 B2
(45) Date of Patent: Jun. 24, 2008

(54) WAVELENGTH DIVISION MULTIPLEXING OPTICAL TRANSMISSION EQUIPMENT AND METHOD OF AMPLIFYING OPTICAL WAVELENGTH DIVISION MULTIPLEXED SIGNALS

(75) Inventors: Tetsuya Uda, Tokyo (JP); Shigehiro Takashima, Tokyo (JP); Shigenori Hayase, Tokyo (JP); Yoshimasa Kusano, Tokyo (JP); Satoshi Asamizu, Tokyo (JP); Hirofumi Nakano, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/711,951

(22) Filed: Feb. 27, 2007

(65) Prior Publication Data

US 2007/0166052 A1   Jul. 19, 2007

Related U.S. Application Data

(63) Continuation of application No. 10/052,308, filed on Jan. 17, 2002, now Pat. No. 7,194,210.

(30) Foreign Application Priority Data

Jun. 4, 2001  (JP)  ............................. 2001-167610

(51) Int. Cl.
    *H04B 10/00*   (2006.01)
(52) U.S. Cl. .......................... 398/97; 398/173; 398/175; 398/177
(58) Field of Classification Search .................. 398/97, 398/173–181
    See application file for complete search history.

(56) References Cited

U.S. PATENT DOCUMENTS

| | | | | |
|---|---|---|---|---|
| 6,049,413 A * | 4/2000 | Taylor et al. | ................. | 359/337 |
| 6,151,160 A * | 11/2000 | Ma et al. | ................ | 359/337.12 |
| 6,212,001 B1 * | 4/2001 | Bode et al. | ................ | 359/337.1 |
| 6,219,176 B1 * | 4/2001 | Terahara | .................. | 359/341.1 |
| 6,275,330 B1 * | 8/2001 | Izumi | ..................... | 359/341.42 |
| 6,292,289 B1 * | 9/2001 | Sugaya et al. | ................ | 359/337 |
| 6,344,914 B1 * | 2/2002 | Shimojoh et al. | ............. | 398/17 |
| 6,388,801 B1 * | 5/2002 | Sugaya et al. | ................ | 359/334 |
| 6,392,769 B1 * | 5/2002 | Ford et al. | ..................... | 398/9 |
| 6,510,000 B1 * | 1/2003 | Onaka et al. | ................ | 359/334 |
| 6,804,464 B2 * | 10/2004 | Yang | ........................... | 398/94 |

* cited by examiner

*Primary Examiner*—Agustin Bello
(74) *Attorney, Agent, or Firm*—Townsend and Townsend and Crew LLP

(57) ABSTRACT

Optical signal transmission is improved by reducing the variance in light output level and OSNR by adjusting optical signal intensity and gain tilt, taking SRS influence into consideration.

3 Claims, 11 Drawing Sheets

(a) Spectrum at
fiber input end (b) Spectrum at
fiber output end

WAVELENGTH DIVISION MULTIPLEXING OPTICAL TRANSMISSION EQUIPMENT AND METHOD OF AMPLIFYING OPTICAL WAVELENGTH DIVISION MULTIPLEXED SIGNALS

CROSS-REFERENCES TO RELATED APPLICATIONS

The present application is a Continuation Application of U.S. application Ser. No. 10/052,308, filed Jan. 17, 2002, which is related to and claims priority from Japanese Patent Application No. 2001-167610, filed on Jun. 4, 2001.

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The present invention relates generally to optical transmission systems, and more particularly to an optical transmission equipment and system that transmit a plurality of optical signals having different wavelengths over a single optical fiber and a method for optically amplifying wavelength division optical multiplexed signals.

As a means of making optical transmission systems have more transmission capacity, Wavelength Division Multiplexing (WDM) transmission systems that transmit a plurality of optical signals having different wavelengths over a single optical fiber are in practical use. Optical fiber amplifiers (hereinafter referred to as optical amplifiers) such as an Erbium-Doped Fiber Amplifier (EDFA) have such characteristics as to enable simultaneous amplification of optical signals in a wide spectrum of wavelengths. By combining WDM with optical amplifiers, a plurality of optical signals with different wavelengths are amplified at a time and thus economical, large-capacity, and long-range transmission can be realized in simple structure.

In such WDM and optical amplification transmission manner, however, the power level of light beams input to a fiber is so high that it has posed a problem of nonlinear effect that deteriorates transmission characteristics. One typical nonlinear effect is Stimulated Raman Scattering (SRS) that causes problems of over-loss and over-gain.

The SRS is a nonlinear optical process in which part of input signals to an optical fiber act as excitation light and interact with lower-frequency signal light beams in the fiber, causing energy to move from higher-frequency signal light beams to lower-frequency signal light beams. The SRS takes place in all optical fibers and its influence degree depends on the optical fiber type and the frequency difference between optical signals for which such energy moving occurs.

The moving energy increases in proportion to the sum of the intensity of all light beams output by WDM. The more the number of wavelengths accommodated by WDM equipment and the wider the wavelength bands accommodated, the moving energy will be higher and the manifestation of its influence will be significant. Moreover, the longer the distance of transmission, the manifestation of its influence will be more significant.

For the WDM equipment that accommodates signals with different wavelengths, such a problem arises that the light output intensity varies by wavelength at the receiving end and consequently varying optical signal-to-noise ratios (OSNR) are measured for different wavelengths. Because light output intensity variation by wavelength also occurs during transmission over a fiber, a further problem arises that self phase modulation, chromatic dispersion and frequency chirp in combination cause different receiving waveform distortions for different waveforms, transmission errors, and transmission distance variance by wavelength.

In conventional WDM equipment operating condition, since the number of wavelengths of optical signals accommodated and wavelength bands were relatively small, the influence of SRS was not so much. However, due to recent communications traffic expansion, request has been made to the WDM equipment for increasing the number of wavelengths to be accommodated and bandwidth extension. Thus, it now becomes impossible to be regardless of the influence of SRS. Some recent academic report has pointed out that, if the WDM equipment accommodates all wavelengths assumed by its initial design, the influence of SRS becomes so great as to make transmission impossible.

Some previous transmission systems using the WDM equipment have been proposed with consideration given to the influence due to the dependency on the gain tilt of an optical amplifier integrated into the system and the wavelength loss of a transmission path; for example, a method for obtaining the minimum OSNR by suppressing the gain tilt occurring in optical amplifiers, set forth in JP-A No. 223136/1996, and a method for minimizing the optical signal power level variance and the OSNR at the receiving end, set forth in JP-A No. 55812/1999.

The above-mentioned previous inventions are effective if optical signals input to optical amplifiers always have constant light output intensity, that is, transmission loss and optical amplifier gain tilt do not vary as the number of wavelengths increases or decreases. However, there is no consideration to a case that the light output intensity varies, according to the number of wavelengths accommodated and the wavelength bandwidth.

In JP-A No. 183818/2000, a method for making the OSNR at the receiving end constant by adjusting the intensity (pre-emphasis) of the optical signals having different wavelengths at the sending end has been proposed. However, if the number of wavelengths accommodated is great in a wide spectrum, extremely great signal output level variance may occur so as to exceed the level variance that can be corrected by the pre-emphasis.

There is a need to provide a wavelength division multiplexing optical transmission system that is capable of rectifying the signal-to-noise ratio variance of optical signals received at the receiving end. Although there may be some possible factors causing such variance, particularly, the present invention is intended to rectify the variance caused by Stimulated Raman Scattering (SRS) that optical signals being transmitted over a fiber encounter.

It is desirable to provide a method of estimating beforehand the signal-to-noise ratio variance of optical signals to be received at the receiving end, based on the intensity characteristics of optical signals output from optical amplifiers, in order to rectify such variance caused by SRS.

Yet, another object of the present invention is to provide a method of configuring the above system with optical transmission equipment having optical amplifier output characteristics to rectify the signal-to-noise ratio variance of optical signals to be received at the receiving end, based on the estimated variance.

SUMMARY OF THE INVENTION

In accordance with the invention, optical signal transmission method and apparatus comprise adjusting the optical signal at transmission and/or receiving stations. In one aspect of the invention, a signal received at a station is adjusted so that its power is comparable to the power of the signal when it was transmitted to the station. In another aspect of the invention, each station adjusts the signal in a manner according to an analysis of the transmission path.

DESCRIPTION OF THE SPECIFIC EMBODIMENTS

To rectify the signal-to-noise ratio variance of optical signals to be received at the receiving end in the optical transmission system for transmitting wavelength division multiplexed signals, with special attention paid to the variance in light output intensity of the optical signals, caused by Stimulated Raman Scattering (SRS) that the optical signals encounter when being transmitted across a fiber path, the present invention is designed to rectify this variance. In view hereof, the output intensity of optical signals at the input end is adjusted. Following is a brief introduction to various aspects of the invention, prior to a discussion of the illustrative embodiments of the invention.

In accordance to the present invention, to estimate the SRS-induced signal-to-noise ratio variance of optical signals to be received at the receiving end, variance in the light output intensity of optical signals at the receiving end is calculated from the output intensity of optical signals at the input end, the sectional area of the fiber, the effective distance in which nonlinear effect such as SRS actually takes place, and a Raman gain coefficient. Using the thus calculated variance in the output intensity, the signal-to-noise ratio variance of optical signals is calculated.

From the thus calculated signal-to-noise ratio variance of optical signals, inversely, the output intensity of the optical signals at the input end to rectify such variance is calculated. The thus obtained output intensity is reflected in a deviation table to contain the respective output intensity of the amplifiers for wavelength bands of signals to be amplified for each span in the optical transmission system.

To make the amplifiers have their optimum characteristics based on the values set in the deviation table, each optical amplifier is provided with functions that enable variable control for both average output intensity for its wavelength band and output intensity deviation (gain tilt) over the range of the wavelengths falling within the band.

Figure 1:
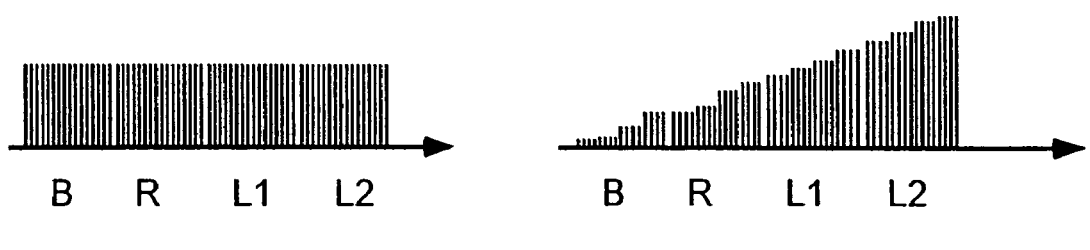
FIG. 1 is illustration for explaining the influence of SRS on optical signals transmitted by a WDM system.

FIG. 1 is an illustration provided for explaining the above-described influence of SRS. FIG. 1 shows spectra of wavelength division multiplexed optical signals on the abscissa of frequency and the ordinate of output intensity (output level). Here, wavelength bands identified by B, R, L1, L2 have, for example, width of 1530-1545 nm, 1545-1560 nm, 1560-1575 nm, 1575-1590 nm, respectively.

Even if some adjustment was made so that the light output intensity keeps equal for optical signals in all wavelength bands (B, R, L1, L2) at the fiber input end as shown in FIG. 1(a), the light output intensity of the optical signals received at the fiber output end varies by wavelength as shown in FIG. 1(b). The shorter the wavelength, the lower will be the light output intensity; the longer the wavelength, the higher will be the light output intensity. This is because energy moves from the shorter-wavelength signals to longer-wavelength signals as described above.

Figure 2:
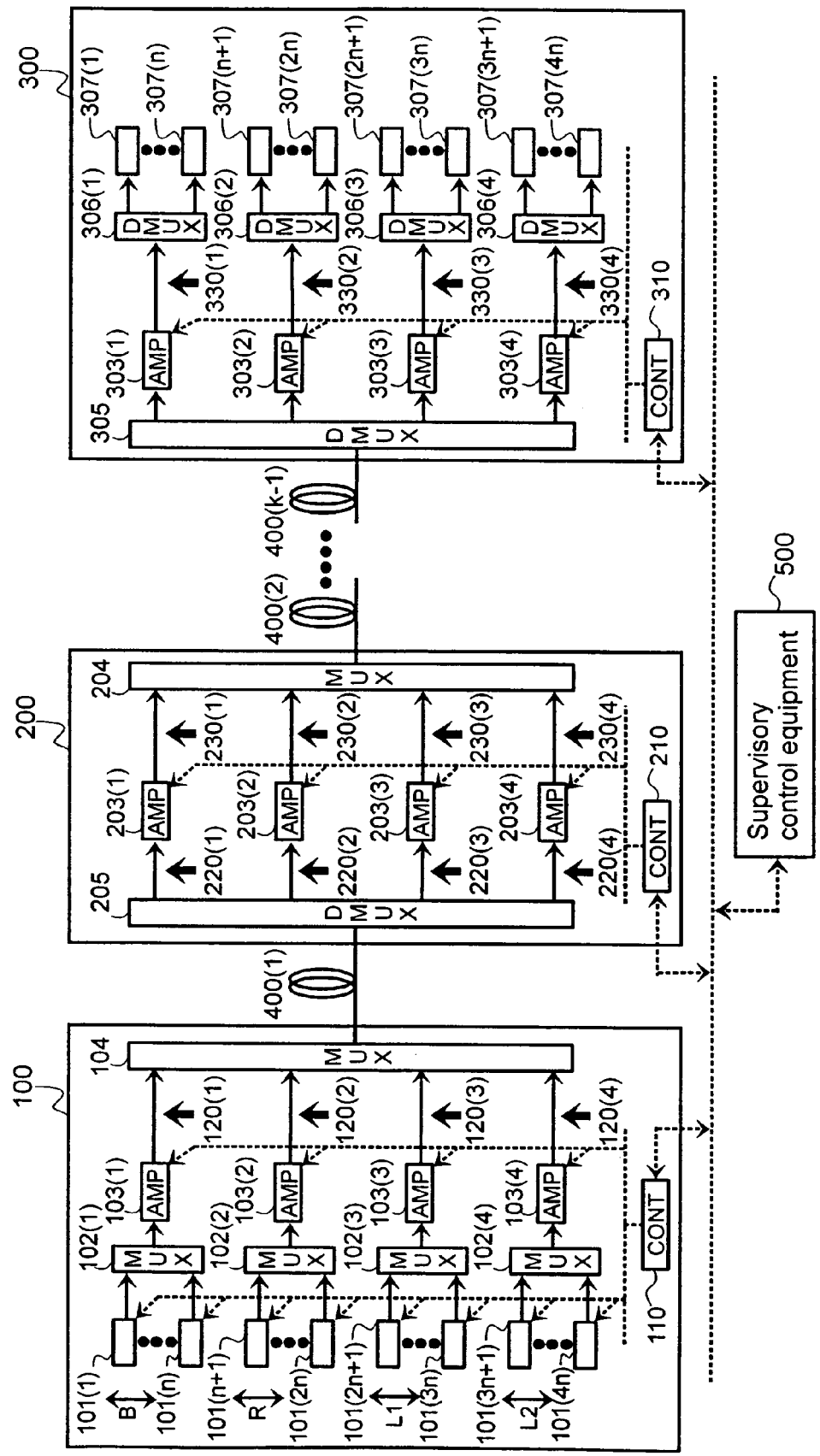
FIG. 2 is a block diagram showing a system configuration of the present invention.

FIG. 2 shows a basic configuration of a wavelength division multiplexing optical transmission system configured, according to an illustrated embodiment of the present invention. In FIG. 2, reference numeral 100 denotes a sending-end station; 200 denotes a relay station; 300 denotes a receiving-end station; and 400 denotes an optical fiber transmission path. Reference numeral 500 denotes a supervisory control equipment which is separately provided to supervise and control the overall system. In the present configuration, respective optical amplifiers for the above-mentioned wavelength bands (B, R, L1, L2) are employed to amplify optical signals in each band. To each optical amplifier, optical signals having n different wavelengths, which have been wavelength division multiplexed, are assumed to be input.

Optical transmitters 101(1) to 101(n) at the sending-end station 100 deliver optical signals with different wavelengths falling within the B band. The delivered optical signals are wavelength division multiplexed through a wavelength multiplexer 102(1), amplified by a pre-amplifier 103(1), and input to a wavelength multiplexer 104. Similarly wavelength multiplexed and amplified optical signals in the R band, L1 band, and L2 band are input to the wavelength multiplexer 104. The wavelength multiplexer executes wavelength division multiplexing of the optical signals delivered from the pre-amplifiers 103(1) to (4) and transmits the thus wavelength division multiplexed optical signals over a optical fiber transmission path 400(1).

At the relay station 200, a wavelength demultiplexer 205 demultiplexes the input wavelength division multiplexed optical signals into the above four bands (B, R, L1, L2) and line amplifiers 203(1) to (4) for each band amplify the optical signals to rectify the transmission loss occurred through the optical fiber 400(1). After being amplified, the optical signals are wavelength division multiplexed again by a wavelength multiplexer 204 and transmitted over an optical fiber transmission path 400(2). The system is assumed to include a plurality of relay stations, which are not shown in FIG. 2, following the relay station 200. After being similarly amplified by the plurality of relay stations, eventually, the wavelength division multiplexed optical signals are transmitted through an optical fiber 400 (k–1) in the final span to the receiving-end station 300.

At the receiving-end station 300, a wavelength demultiplexer 305 demultiplexes the input wavelength division multiplexed optical signals into the above four bands (B, R, L1, L2). Then, post-amplifiers 303(1) to (4) amplifies the optical signals for each band. Optical demultiplexers 306(1) to (4) demultiplex the amplified optical signals into discrete wavelength optical signals which are received by optical receivers 307.

Figure 7:
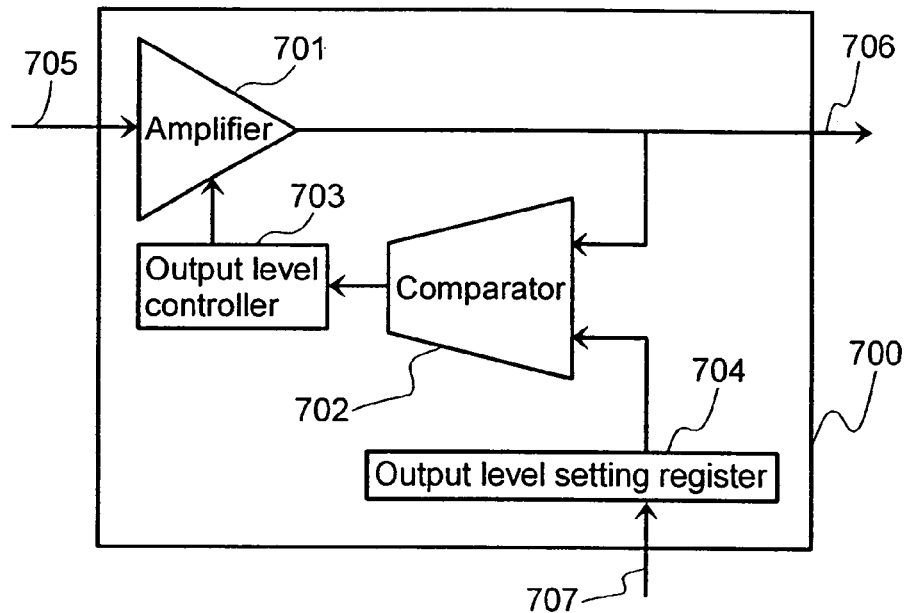
FIG. 7 shows an optical amplifier provided with an output intensity adjusting function, used in the present invention.

In accordance with Embodiment 1 illustrating an aspect of the present invention, control (hereinafter, "gain averaging") is exercised so that the total output light intensity from each of the amplifiers (e.g., pre-amplifiers 103 at the sending-end station 100, line amplifiers 203 at the relay station 200, and post-amplifiers 303 at the receiving-end station 300) will be equal for the wavelength bands (B, R, L1, L2), which will be explained below. FIG. 7 shows the configuration of an optical amplifier used in Embodiment 1. Thus power of the signal transmitted from the multiplexer 104, which combines the signals from the pre-amplifiers 103(1) to (4), is substantially equal to the power of the signal transmitted from the multiplexer 204, which combines the signals from the line amplifiers 203(1) to (4). Similarly, the power of the signal transmitted from the multiplexer 204, which combines the signals from the line amplifiers 203(1) to (4), is substantially equal to the total power of the individual signals produced by the post-amplifiers 303(1) to (4).

Referring to FIG. 7, the optical amplifier 700 is comprised of an amplifier 701 which amplifies an input optical signal 705 and outputs it as an output optical signal 706, an output level controller 703 which controls the output intensity of the amplifier 701, an output level setting register 704 into which externally supplied output intensity 707 setting of optical signals is stored, a comparator 702 which compares the light output intensity of the output optical signal 706 and the target light output intensity in the output level setting register 704.

Based on the comparison result from the comparator 702, the output level controller 703 controls the light output intensity as follows. When the light output intensity of the output optical signal 706 is smaller than the value in the output level setting register 704, the output intensity of the amplifier 701 will be made greater. For the inverse result of comparison, the output intensity of the amplifier 701 will be made smaller.

Figure 3:
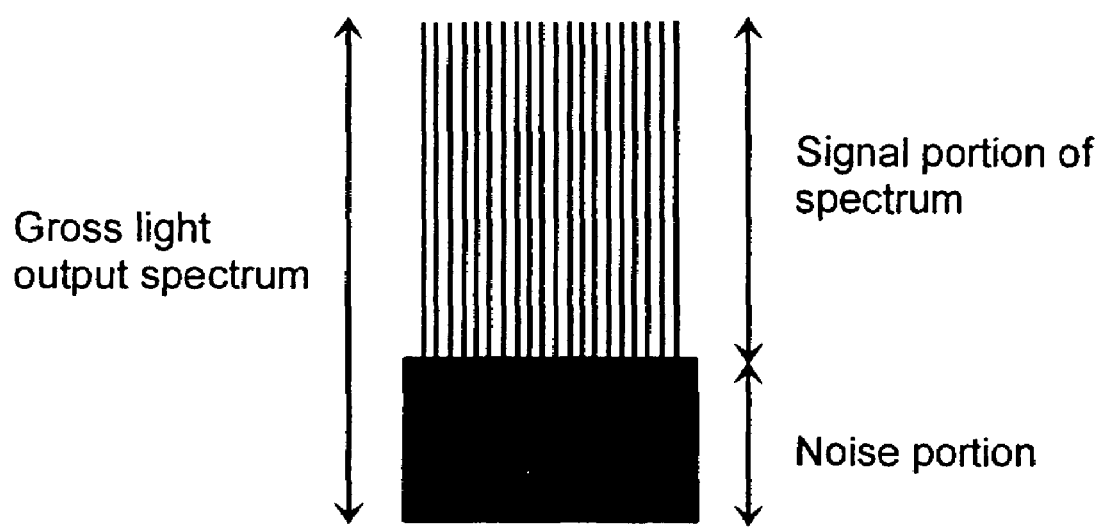
FIG. 3 is illustration for explaining spectrum representation.
Figure 4:
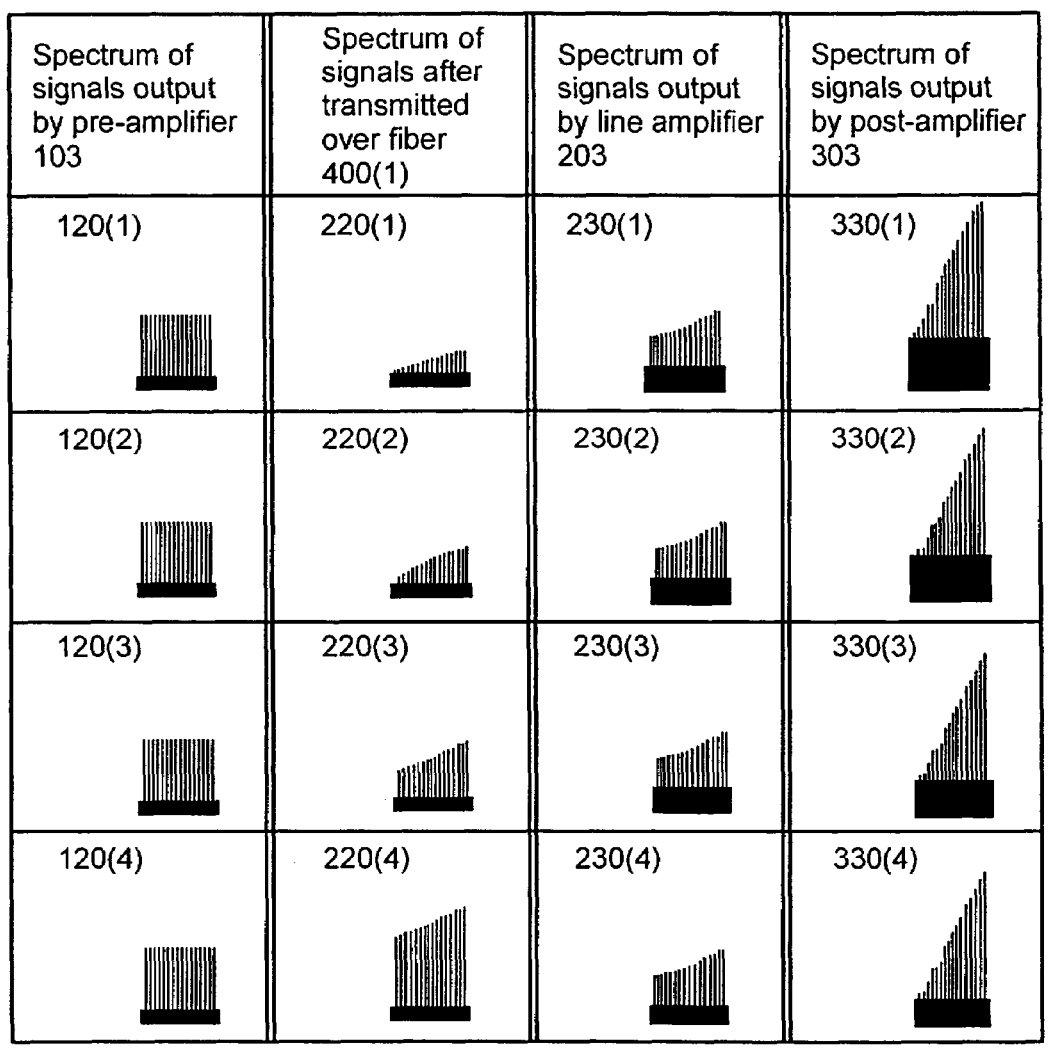
FIG. 4 shows spectra illustrative of the light output intensity of optical signals under the influence of SRS.

FIG. 4 shows output spectra of signals including noise observed at observation points in the system of Embodiment 1. Each spectrum example is shown in FIG. 3 where the vertical lines correspond to signal components and the solid black portion corresponds to noise. Numbers (120(1) to (4), 220(1) to (4), 230(1) to (4), 330(1) to (4)) given at the upper left of the spectrum views shown in FIG. 4 correspond to the observation points in FIG. 2 indicated by an arrow mark with the corresponding number. The spectra 120(1) to (4) of the signals output by the pre-amplifiers 103(1) to (4) indicate that the amplifiers for the wavebands output the signals of the same characteristics.

However, because of the influence of SRS occurring during the transmission over the transmission path 400(1), the spectra 220(1) to (4) observed after the transmission show greater light output for longer wavelengths in view of both the wavelengths in a band and the wavelength bands. Then, gain averaging is performed by the line amplifiers 203. Consequently, the spectra 230(1) to (4) show average light output intensity for the wavelengths, that is, the gross light output intensity as a total of the signal and noise portions for the wavelengths in a band is equal for the wavelength bands. However, the level variance (tilt) for the wavelengths in a band cannot be compensated for by the gain averaging function and remains as is. The spectra 330(1) to (4) after further several stages of transmission through transmission paths 400 and via relay stations 200 show even greater variance (tilt).

According to the described Embodiment 1 of the present invention, the spectra 120 (1) to (4) characteristic of the optical signals output by the pre-amplifiers 103 do not show OSNR variance depending on wavelength because SRS influence does not occur. As the amplifiers 203, 303 are controlled to make the total light output intensity equal for the wavelength division bands, the SRS influence can be compensated for within some transmission range.

However, for the optical signals transmitted through the later stages of optical fibers and line amplifiers and output from the post-amplifiers, a degradation in the OSNR is significant for shorter wavelengths in view of both the wavelengths in a band and the wavelength bands. Consequently, the optical receivers 307 receive optical signals for which a degradation in the transmission characteristics is found for shorter wavelengths in a wavelength band. This degradation is significant for the shorter wavelength bands. This is because the optical amplifiers amplify the signal and noise components together. For shorter wavelength signals with their output intensity decreased under the influence of SRS, the noise component relatively increases by the output intensity averaging function of the amplifiers.

In Embodiment 1, for simplification, it was assumed that the number of wavelengths to fall within a band is n for all wavelength bands and the total output intensity is equal for the wavelength bands. If the number of wavelengths per band varies, it should be assumed that the output intensity per wavelength is equal. This also applies to a Embodiment 2 which will be described below.

Next, Embodiment 2 illustrating another aspect of the present invention will be described below. In Embodiment 2, the wavelength-dependent input level variance of optical signals that are input to the multiplexers after amplified by the pre-amplifiers 103, line amplifiers 203, and post-amplifiers 303 (shown in FIG. 2) is compensated for so that signal output intensity characteristics will be equal for the wavebands (gain tilt compensation). A method of rectifying the gain tilts can be realized by providing the optical amplifiers with a wavelength-dependent optical filter in their rear stage and tuning wavelength-specific transmission characteristics for each amplifier.

Figure 5:
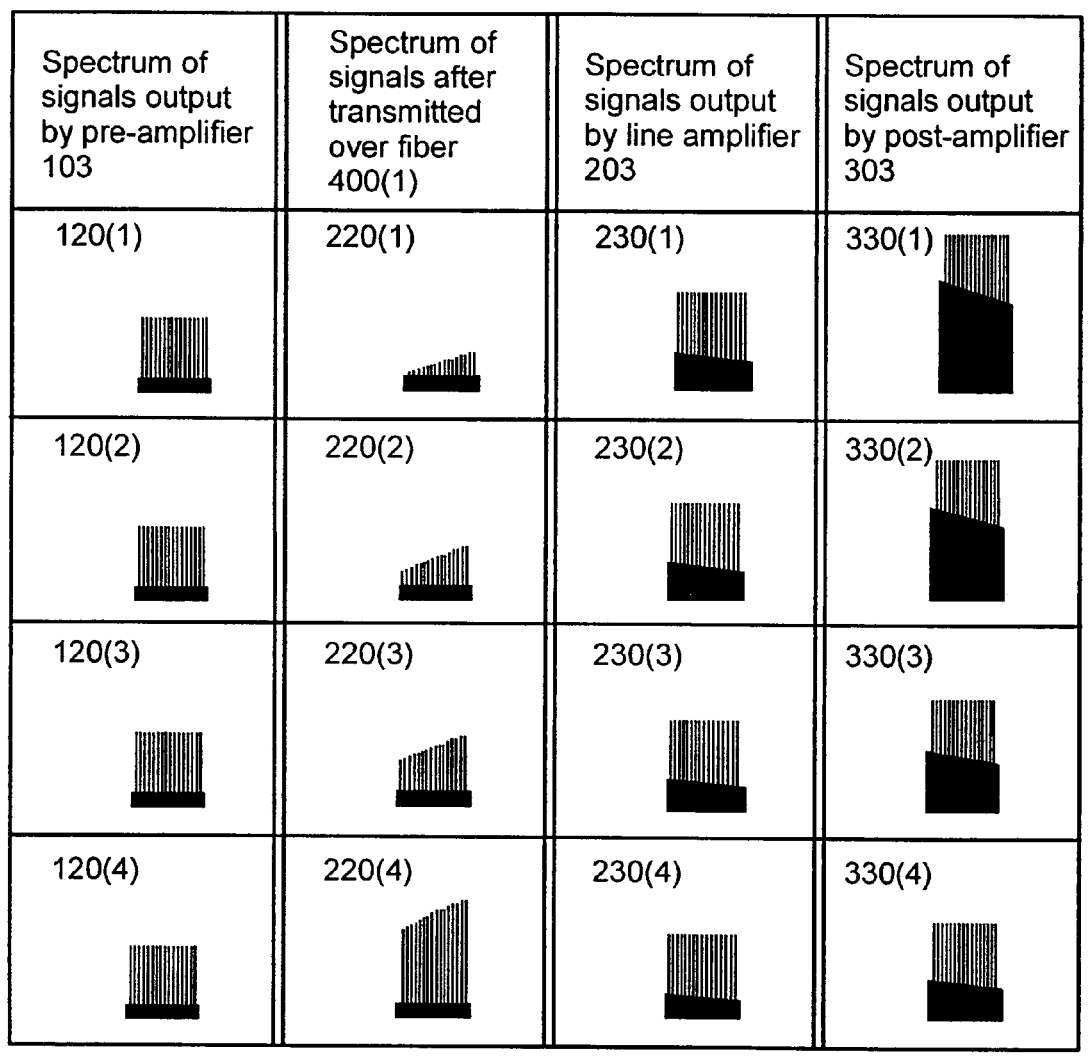
FIG. 5 shows further spectra illustrative of the light output intensity of optical signals under the influence of SRS.

FIG. 5 shows the output spectra in Embodiment 2 of the present invention. Here, the spectra 220(1) to (4) show gain tilts caused by SRS, whereas the spectra 230(1) to (4) of the signals output by the line amplifiers 203 show even gains after compensation. The spectra of the signals output by the post-amplifiers 330 also show even gain characteristics.

In the described Embodiment 2 of the present invention, the amplifiers are controlled to make the output intensity of the optical signals equal for the wavelength division bands. Thus, the SRS influence can be compensated for within some transmission range. However, due to that the optical amplifiers amplify the signal and noise components together as in Embodiment 1, for shorter wavelength signals with their output intensity decreased under the influence of SRS, the noise component relatively increases and results in a degradation in the OSNR.

Next, Embodiment 3 illustrating another aspect of the present invention will be described below.

Figure 6:
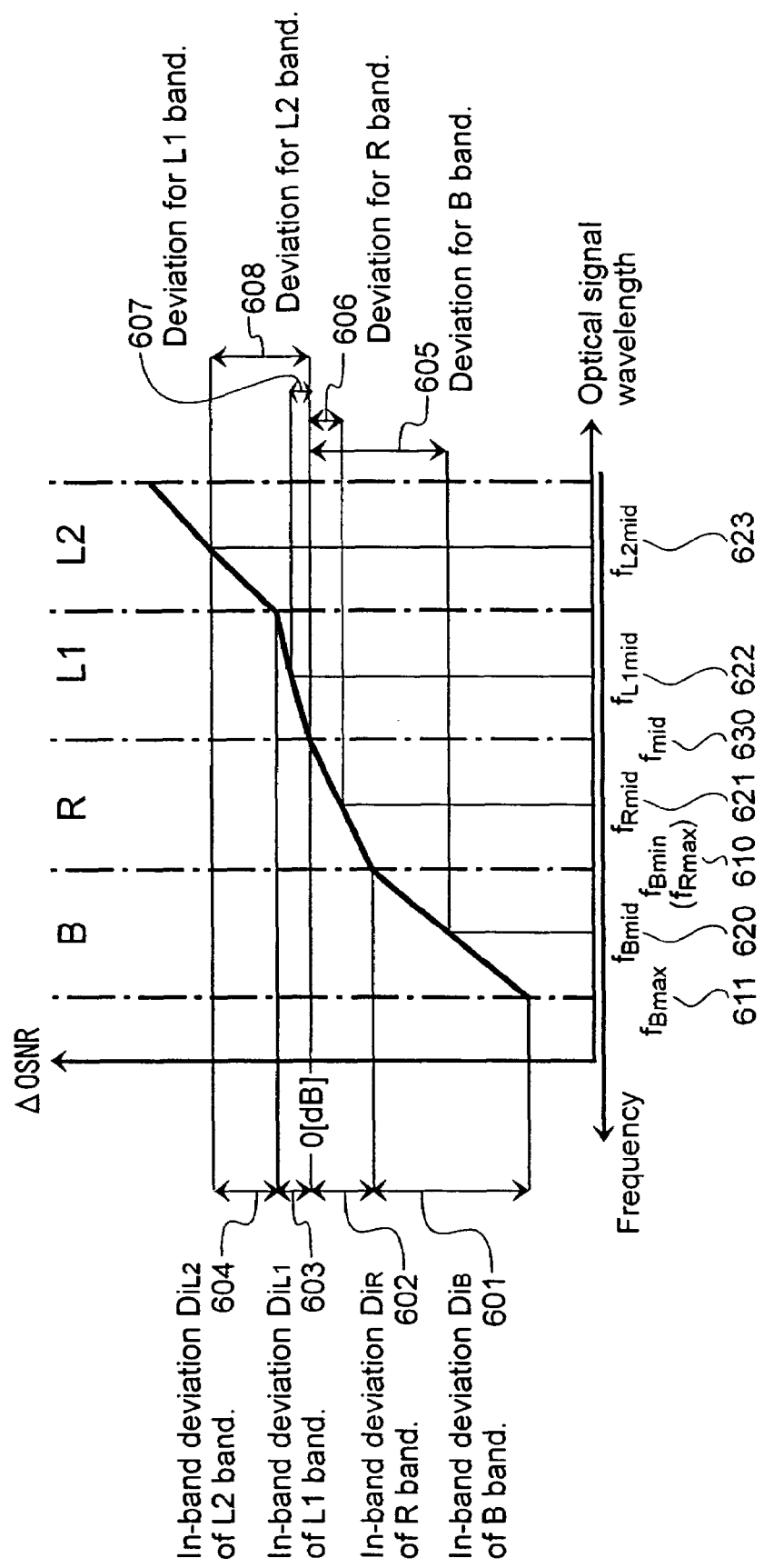
FIG. 6 shows a graph for explaining in-band deviation and deviation for band in terms of the optical SNR, which are to be solved by the present invention.

FIG. 6 shows OSNR descending in view of the wavelengths in a band (in-band deviation) and the wavelength bands (deviation for band), which occurs in Embodiments 1 and 2. Here, wavelength and frequency of wavelength division multiplexed optical signals are scaled on the abscissa and deviation (ΔOSNR) of OSNR degradation caused by SRS is scaled on the ordinate (on the abscissa, wavelength increases toward the right and frequency increases toward the left). ΔOSNR is ratio of OSNR under the influence of SRS to OSNR' not under the influence of SRS (difference between OSNR and OSNR').

Relative to OSNR (ΔOSNR=0) at the center wavelength $f_{mid}$ 630 for all optical signals accommodated by a fiber, ΔOSNR also indicates deviation of OSNR of optical signals with other frequencies. This is because SRS causes energy to move from higher-frequency signals to lower-frequency signals in all accommodated bands as described above, but optical signals at the center wavelength ($f_{mid}$ 630) in the bands are not affected by SRS with regard to OSNR.

Refer to FIG. 6 and note at the B band, for example. In-band deviation DiB 601 takes place between the maximum frequency $f_{Bmax}$ 611 and the minimum frequency $f_{Bmin}$ 610 for the signals accommodated in the band. Similarly, for the R, L1, and L2 bands, in-band deviations $D_{iR}$ 602, $D_{iL1}$ 603, and $D_{iL2}$ 694 take place respectively. Given that we regard the center wavelength of each band, namely, $f_{Bmid}$ 620, $f_{Rmid}$ 621, and $f_{L1mid}$ 622, and $f_{L2mid}$ 623 as the reference frequency of each band, the ΔOSNRs at these frequencies, 605, 606, 607, and 608 are the deviations for bands. Embodiment 3 is intended to rectify such in-band deviations and deviations for bands of OSNR.

Figure 8:
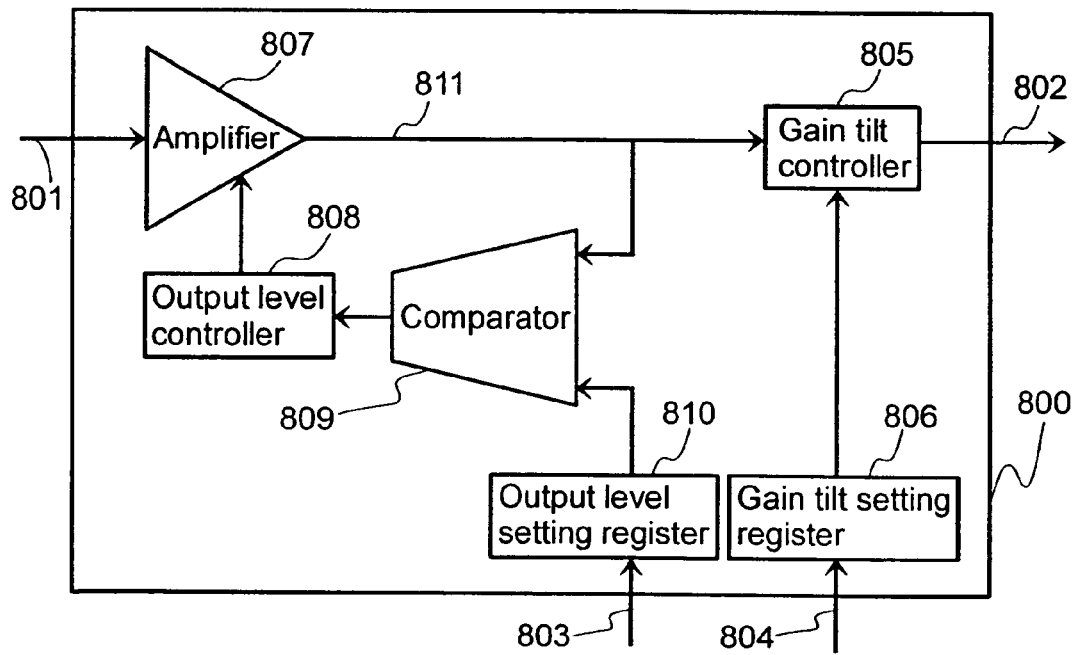
FIG. 8 shows another optical amplifier provided with an in-band deviation rectifying function and an output intensity adjusting function, used in the present invention.

FIG. 8 shows the configuration of an optical amplifier used in Embodiment 3. The optical amplifier 800 is applied to each of the amplifiers 103(1) to (4), 203(1) to (4), and 303(1) to (4) shown in FIG. 2. The present optical amplifier is assigned a predetermined wavelength band and is to amplify multiplexed optical signals falling within the band. Moreover, the optical amplifier has a function of adjusting average light output intensity of optical signals accommodated by it and light output intensity variance by wavelength in the band, according to externally supplied setting.

Multiplexed optical signals input through an input terminal 801 are amplified by an amplifier 807. A comparator 809 compares an amplified signal 811 against the light output level setting preset in the output level setting register 810. An output level controller 808 controls the rate of amplification of the amplifier 807 so that the output intensity of the amplified signal will match the output level setting. Multiplexed optical signals 811 whose light output intensity adjusted to the output level setting are input to a gain tilt controller 805. The signals with gain tilt characteristics as preset in a gain tilt setting register 806 are output. As will be shown in FIG. 9, the gain tilt controller 805 can control gain tilt characteristics by means of variable control of the incident angle of light, using such an optical filter that is, for example, wavelength-dependent with regard to light transmission characteristics.

Figure 9:
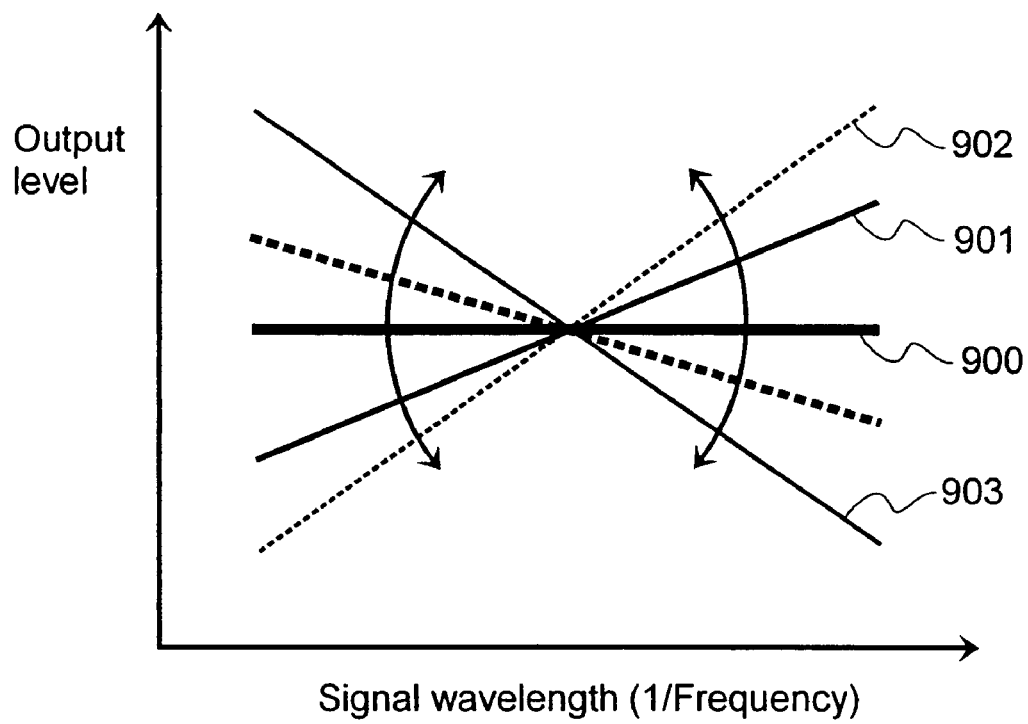
FIG. 9 is a graphic representation for explaining the function of a gain control unit.

Referring to FIG. 9, line 900 indicates flat gain characteristics of signals over the range of wavelengths (1/frequency). Lines 901 and 902 indicate that the light output intensity of longer-wavelength signals (lower-frequency signals) is greater than that of shorter-wavelength signals (higher-frequency signals). Line 903 indicates that the inverse gain tilt characteristics are set.

Figure 10:
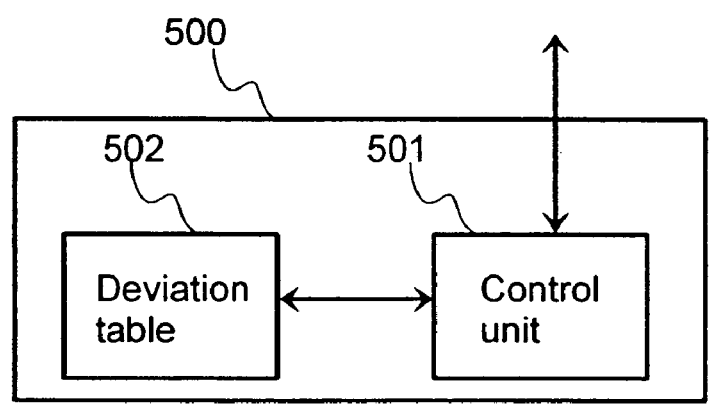
FIG. 10 is a diagram showing the supervisory control equipment used in the illustrated embodiments of the present invention.

FIG. 10 shows the configuration of supervisory control equipment used in Embodiment 3. The supervisory control equipment 500 is comprised of a control unit 501 and a deviation table 502. In the deviation table 502 contains values of light output intensity and gain tilt to be set for each optical amplifier. Values of light output intensity and gain tilt for each amplifier are calculated beforehand so that deviation of OSNR degradation caused by SRS can be rectified by them and registered into the deviation table 502. Using these values, the amplifiers 103, 203, and 303 shown in FIG. 2 can be adjusted to output optical signals with desired characteristics.

Figure 11:
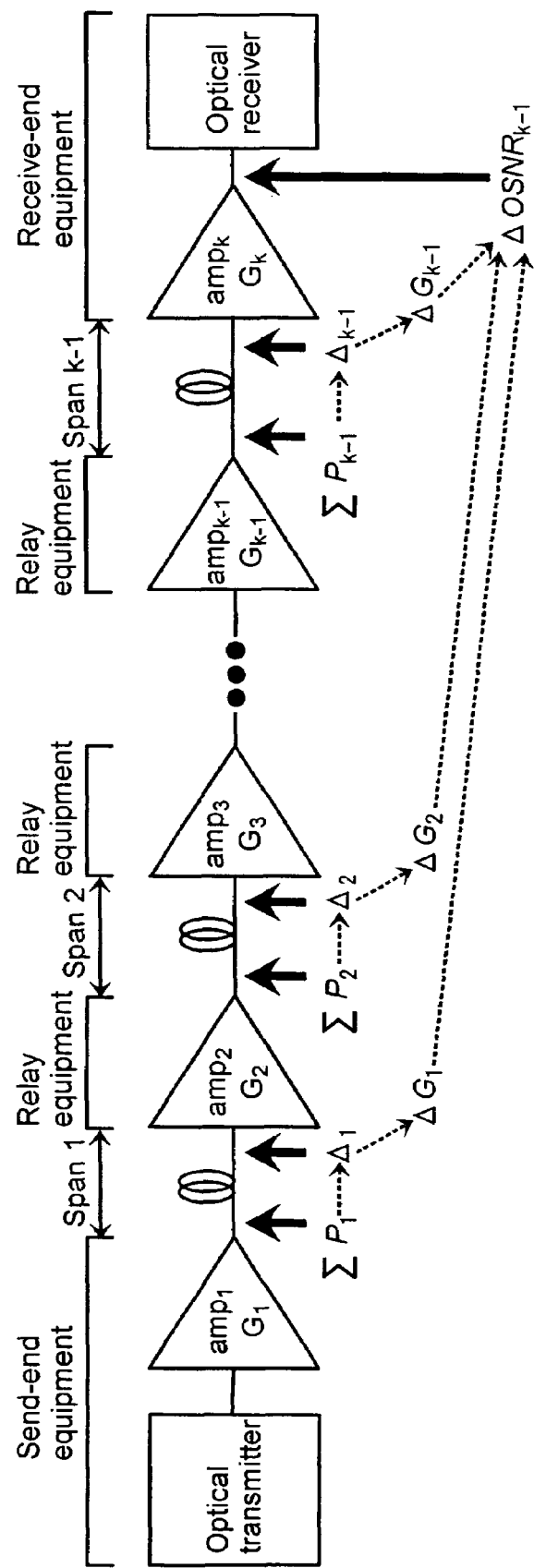
FIG. 11 is a schematic diagram for explaining the method of calculating optical SNR deviation in an illustrated embodiment of the present invention.

With reference to FIG. 11, a method of calculating values of light output intensity and gain tilt which are registered in the deviation table so as to be set for each optical amplifier will be explained below. FIG. 11 is simplified representation of the optical amplifiers, optical fibers, optical transmitters and optical receivers shown in FIG. 2, wherein the discrete transmitters, receivers, and optical amplifiers for the wavelength bands shown in FIG. 2 are represented by single entities.

For the multiplexed optical signals received at the output end of an optional fiber in span K (where K=1 to k−1), a tilt $Δ_K$ of their output intensity over the range of their wavelengths (frequencies), which is caused by SRS, is first obtained. From summation of the output intensity of the optical signals of all wavelengths at the input end of the optical fiber, the tilt $Δ_K$ is calculated by using Equation 1.

$$Δ_{K=-10\log}\left\{e * g * \sum_{i=1}^{N} P_i * \left(\frac{L_{eff}}{2*A}\right)\right\} \quad \text{[Equation 1]}$$

where, log is a common logarithm;
 e is the base of a natural logarithm (2.718 . . . );
 g is called a Raman gain coefficient, a value uniquely determined by the material, length, etc. of the optical fiber;
 $ΣP_i$ is summation of the output intensity of the optical signals of all wavelengths at the input end, input to the fiber in each span, wherein i is 1 to the number (N) of wavelengths of multiplexing;
 A is a sectional area of the fiber; and
 $L_{eff}$ is an effective distance in which nonlinear effect such as SRS actually occurs and is given by Equation 2.

$$L_{eff} = \frac{1 - e^{(-a*Z_k)}}{a} \quad \text{[Equation 2]}$$

where, $Z_K$ is the fiber length (transmission distance) in span K; and
 α is a fiber loss rate, a value of about 0.22 dB/km The value $Δ_K$ indicates an increment in light output intensity per unit wavelength, that is, a tilt of the output intensity of the signals received at the output end of the optical fiber in each span. As evident from equation 1, this value is proportional to the number of wavelengths of optical signals accommodated (multiplexed) by the fiber and inversely proportional to the sectional area of the fiber.

In an actual optical transmission system, however, the fiber length (transmission distance) may be 50-100 km or longer.

In such cases, effective distance $L_{eff}$ is generally assumed 20 km regardless of actual distance.

Then, SRS-induced variation $\Delta G_{j,f_h}$ in the output intensity of optical signals with frequency $f_h$ at the receiving end of a fiber in span j is obtained from equation 3 wherein $\Delta_j$ obtained from equation 1 is applied.

$$\Delta G_{j,f_h} = \frac{G_j + \Delta_j * (f_h - f_g)}{G_j} \quad \text{[Equation 3]}$$

where $G_j$, is the output intensity of amplifiers at the input end of the span, which corresponds to the output intensity of optical signals input to the fiber in the span when the signals are not under the influence of SRS.

In equation 3, $f_g$ is a center frequency of the optical signals that are wavelength division multiplexed on the optical fiber. If the fiber accommodates, for example, 11 wavelengths in 0.01-µm steps from 1.55 to 1.65 µm, $f_g$ is the center frequency corresponding to a wavelength of 1.60 µm. In equation 3 when $f_h=f_g$, $\Delta G_{j,f_h}=1$ indicating that SRS-induced output intensity variance does not exist. This is because energy moves from shorter-wavelength signals to longer-wavelength signals as described with FIG. 1 and the center wavelength is not affected by such energy move.

From the thus obtained SRS-induced variation $\Delta G$ in the output intensity, $\Delta OSNR$ (=OSNR'/OSNR) that is ratio of OSNR' under the influence of SRS to OSNR not under the influence of SRS can be calculated by using Equation 4 for each frequency $f_h$ of optical signals.

$$\Delta OSNR(f_h) = \frac{1}{k} \left( \frac{1 + \frac{1}{\Delta G_{1,f_h}} + \frac{1}{\Delta G_{1,f_h} * \Delta G_{2,f_h}} + \ldots +}{\frac{1}{\Delta G_{1,f_h} * \Delta G_{2,f_h} * \ldots * \Delta G_{k-1,f_h}}} \right) \quad \text{[Equation 4]}$$

$$= \frac{1}{k} \left( \frac{1 + \frac{1}{\prod_{j=1}^{1} \Delta G_{j,f_h}} + \frac{1}{\prod_{j=1}^{1} \Delta G_{j,f_h}} + \ldots +}{\frac{1}{\prod_{j=1}^{1} \Delta G_{j,f_h}}} \right)$$

$$= \frac{1}{k} \left\{ 1 + \sum_{i=1}^{k-1} \left( \frac{1}{\prod_{j=1}^{1} \Delta G_{j,f_h}} \right) \right\}$$

SRS-induced variance in the light output intensity occurring at the receiving end of the fiber in each span is calculated from the summation of the light output intensity of the optical signals of all wavelengths at the sending end of each fiber. From the above equations 1 to 4, it will be appreciated that deviation $\Delta OSNR$ depends on the frequency f and the light output intensity in each span (1 to k−1) of the optical signals of a certain wavelength. Inversely, if the output intensity of optical signals per frequency is properly selected in each span, deviation $\Delta OSNR$ can be set to 0. A method of calculating of such frequency-dependent light output intensity combinations is, for example, as follows: set a tentative value of light intensity of optical signals for each frequency, slightly change the tentative value, calculate $\Delta OSNR$ and update it, and repeat until $\Delta OSNR$ becomes 0. Thereby, eventually, desired frequency-dependent light output intensity combinations can be obtained.

If a proper value based on past experience or the like is selected as an initially set light intensity tentative value and update steps, desired frequency-dependent light output intensity combinations can be obtained with a reduced number of updates by this method. Because $\Delta OSNR$ calculation is not much complex, by using a computer or the like integrated into the supervisory control equipment, convergence is enabled in very short time, and a solution can be obtained.

Now, light intensity combinations obtained in this manner are expressed by equation 5.

$$\begin{pmatrix} P(1, f_{B\min}) & \ldots & P(1, f_{Bmid}) & \ldots & P(1, f_{B\max}) & P(1, f_{R\min}) & \ldots & \ldots & P(1, f_{L2\max}) \\ P(2, f_{B\min}) & \ldots & P(2, f_{Bmid}) & \ldots & P(2, f_{B\max}) & P(2, f_{R\min}) & \ldots & \ldots & P(2, f_{L2\max}) \\ \vdots & & \vdots & & \vdots & \vdots & & & \vdots \\ P(k-1, f_{B\min}) & \ldots & P(k-1, f_{Bmid}) & \ldots & P(k-1, f_{B\max}) & P(k-1, f_{R\min}) & \ldots & \ldots & P(k-1, f_{L2\max}) \end{pmatrix} \quad \text{[Equation 5]}$$

where, P (K, F) is light output intensity of signals with frequency F in span K;

$f_{Bmin}$, $f_{Bmid}$, and $f_{Bmax}$ are the minimum, center, and maximum frequencies of signal wavelengths that fall within the B band; and $f_{Xmax}$, $f_{Xmid}$, and $f_{Xmin}$ are the maximum, center, and minimum frequencies of signal wavelengths that fall within the X band.

If the above P (K, F) combinations have virtually equal tilt over the range of frequencies falling within each band, gain tilt PDi (1, B) to be set for the amplifier for B band in span 1 cancels the light output intensity tilt over the frequencies within the B band and therefore will be obtained as follows:

$$PDi(1, B) = \frac{P(1, f_{B\max}) - P(1, f_{B\min})}{f_{B\max} - f_{B\min}} \quad \text{[Equation 6]}$$

Light out intensity PDb (1, B) that will also be set for the amplifier for B band in span 1 is considered as the light output intensity at the center wavelength in the B band and will be obtained as follows:

$$PDb(1, B) = P(1, f_{Bmid}) \quad \text{[Equation 7]}$$

Similar values to be set for other amplifiers can be obtained in the same way; that is, gain tilt PDi (K, F) and light output intensity PDb (K, F) to be set for the amplifier for F band in span K (K=1 to k−1) are obtained as follows:

$$PDi(F, K) = \frac{P(K, f_{F\max}) - P(1, f_{F\min})}{f_{F\max} - f_{F\min}} \quad \text{[Equation 8]}$$

$$PDB(K, F) = P(K, f_{Fmid}) \quad \text{[Equation 9]}$$

where, $f_{Fmax}$, $f_{Fmid}$, and $f_{Fmin}$ are the maximum, center, and minimum frequencies of signals that fall within the F band.

Because the influence of the light output intensity of the post-amplifiers of the optical receiver on deviation ΔOSNR is substantially negligible in Embodiment 3, final light output intensity at the optical receiver can be gained by setting desired light outputs of the post-amplifiers.

In the described Embodiment 3, it was stated that light output calculations are executed for all spans (K=1 to k−1), but doing so is not always required. If deviation ΔOSNR to be rectified is not so much, it can be rectified only by adjusting optical amplifier output intensity in a certain span. For optical amplifiers for the remaining spans, tentative settings can be used as is.

It is also possible to set a threshold level for rectifiable deviation ΔOSNR for a span. By comparing calculated deviation ΔOSNR with the threshold level, the number of spans for which setting change is required can be determined. This should be applied to cases where the number of multiplexed signals accommodated by the optical fiber slightly increases or decreases during system operation. In such cases, deviation ΔOSNR can be compensated for sufficiently by resetting the amplifiers for a specific span without resetting the amplifiers for all spans. This manner reduces the calculation and setting time as compared with resetting the amplifiers for all spans and enables rapid setting change.

If transmission distance is extremely long, the number of relay stations proportionally increases. Optical amplifiers at all relation stations are not always the ones that can be adjusted by real-time variable control of light output intensity for wavelengths in a band and wavelength bands, which have been assumed used in Embodiment 3. In such cases, inevitably, amplifier output setting is not performed for spans including the amplifiers for which variable control of light output intensity cannot be applied. However, only by adjusting optical amplifier output intensity in other spans, deviation ΔOSNR can be compensated for, if it is not so much, as described above.

In Embodiment 3, similarly, it is not required that the number of wavelengths to fall within each band is always equal for all wavelength bands. In the described Embodiments, the system was described in which optical signals in the wavelength bands accommodated by WDM equipment are amplified by the separate optical amplifiers for the bands. However, the system can also be configured such that optical signals in the wavelength bands accommodated by WDM equipment are amplified by the same amplifier for the bands. Even in this system configuration, light output level and OSNR variance by wavelength can be reduced in the following way. According to the number of wavelengths to fall in a band and the wavelengths, preset values for adjusting a gain tilt over the range of wavelengths falling in a band, taking SRS influence into consideration, for all optical amplifiers in the system or the optical amplifiers for predetermined spans.

Figure 12:
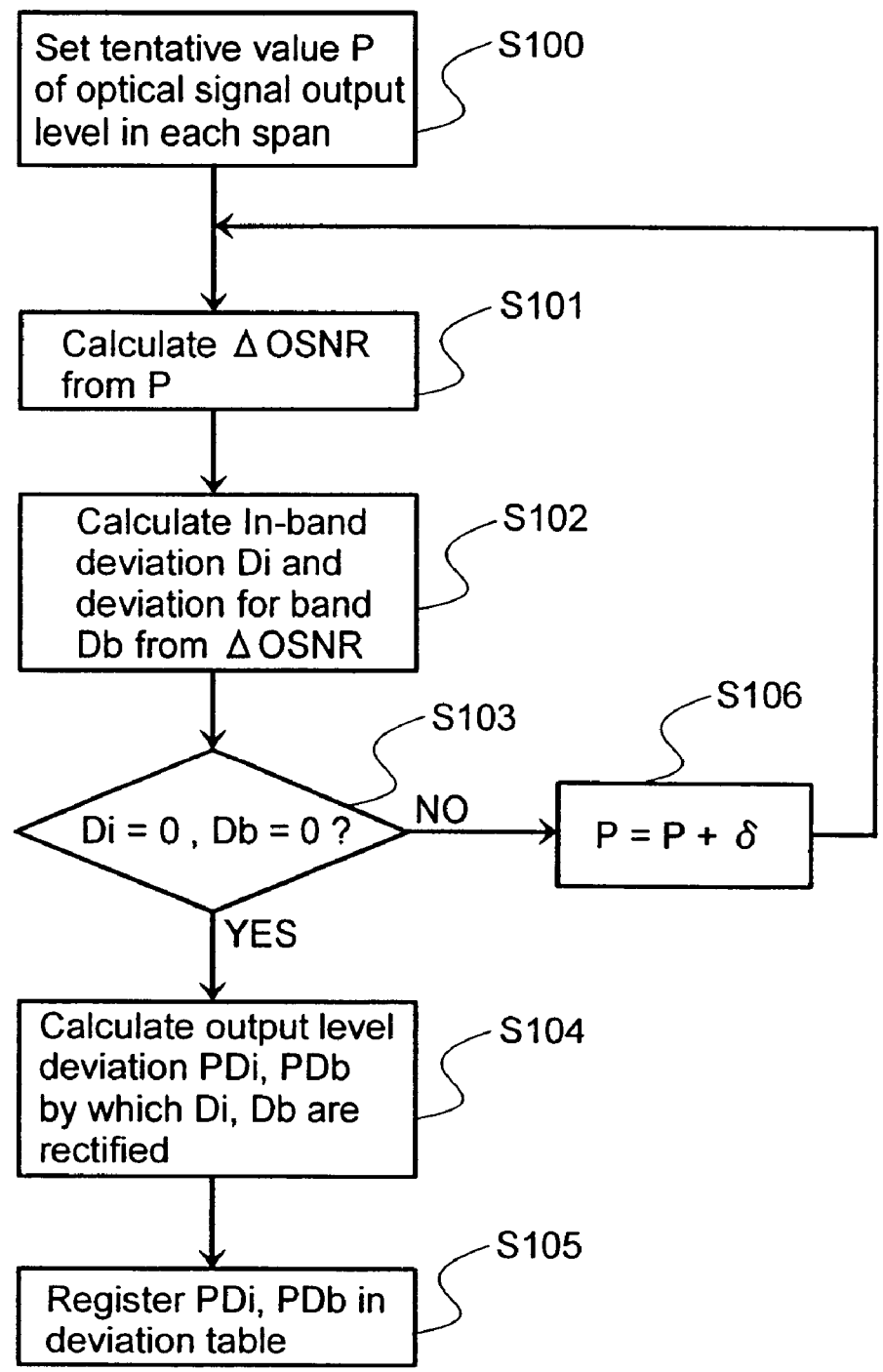
FIG. 12 is a flowchart illustrating the method of calculating optical SNR deviation in an illustrated embodiment of the present invention.

FIG. 12 shows an exemplary flowchart of the following processing: set a tentative value of light intensity P (K, F) of optical signals for each frequency, slightly change the tentative value, calculate ΔOSNR and update it, and repeat until ΔOSNR becomes 0; and eventually, obtain an optimum value of P (K, F) and set it as a target value in the deviation table. According to the flowchart, first, set a tentative value of optical signal output intensity in each span (S100). The tentative value should be not different much from an optimum setting which will be eventually obtained. For example, it is desirable to use a tentative value analogized from an empirical value or the like. Then, from the tentative value, calculate ΔOSNR, using equations (1) to (4) (S101). From the obtained ΔOSNR, calculate in-band deviation (Di) and deviation for band (Db) (S102). If the in-band deviation (Di) and deviation for band (Db) are 0 (S103), from the currently set tentative value, calculate output intensity deviation PDi, PDb by which Di, Db are compensated, using equations (8) and (9) (S104). Register the obtained PDi, PDb in the deviation table (S105). If the above Di, Db calculated from ΔOSNR are not 0 (S103), slightly change the tentative value by incrementing it by a value of δ for optical signal output intensity (S106). By following the same steps, repeat calculating Di, Db until Di, Db eventually become 0, when PDi, PDb from the output intensity are calculated and set in the deviation table. In the step S106, for the value δ by which the tentative value changes, an optimum value should be selected from empirical values or the like.

Figure 13:
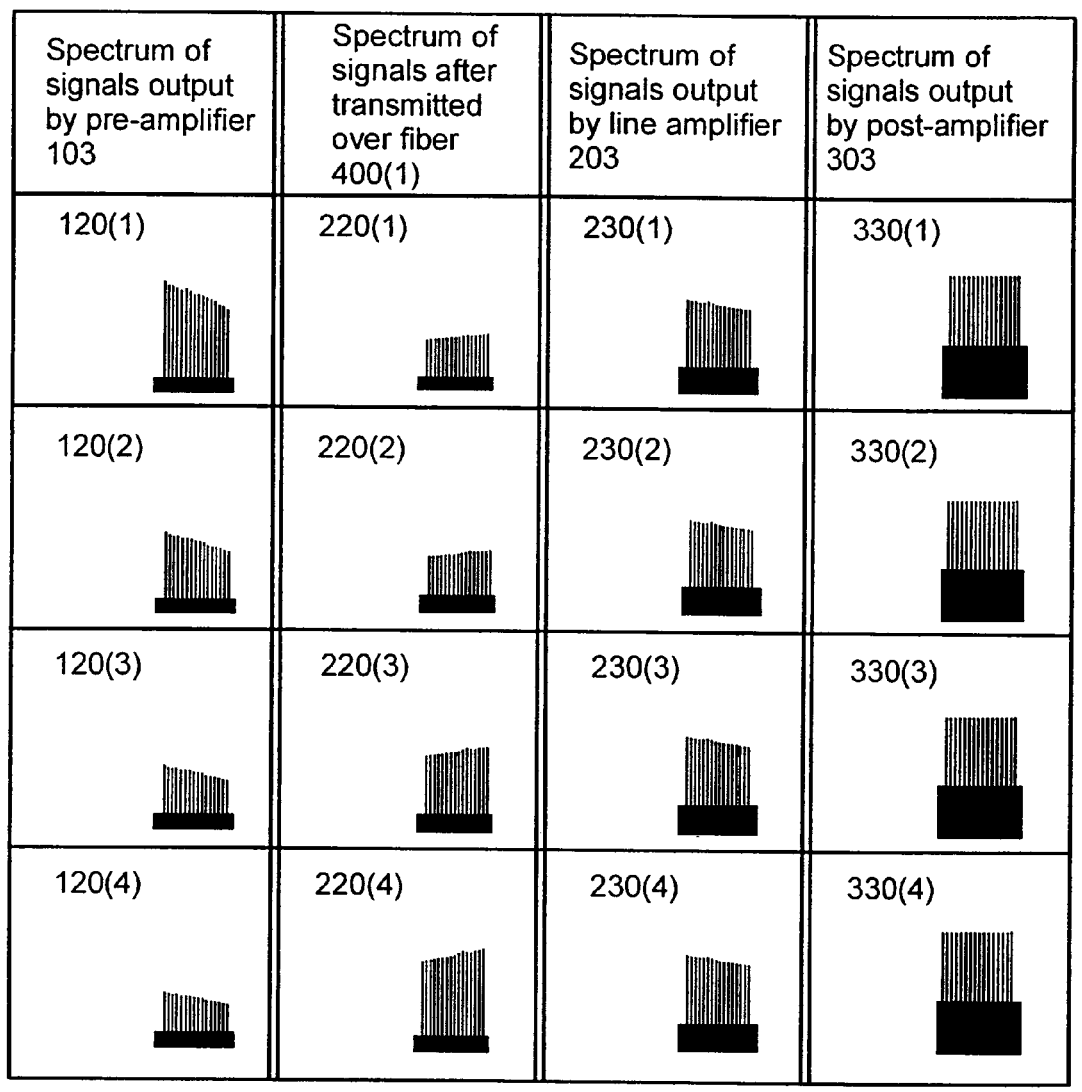
FIG. 13 shows spectra illustrative of the light output intensity of optical signals improved by the present invention.

FIG. 13 is provided to explain the effect of the method of equalizing signal output variance caused by SRS which has been described in Embodiment 3. FIG. 13 shows examples of spectra of output intensity of optical signals observed at the observation points shown in FIG. 2. To equalize the optical SNRs for the wavelength bands for the optical signals output from the final post-amplifiers, the output intensity of the signals output by the amplifiers in the preceding stages is designed to have a tilt. Consequently, the in-band deviation and deviation for band in terms of the optical SNR are compensated for and the purpose is attained, which will be seen from the spectra shown.

In accordance with the present invention, as described above, a wavelength division multiplexing optical transmission system cab be provided that can rectify in-band deviation and deviation for band in terms of the optical SNR caused by SRS.

What is claimed is:

1. A wavelength division multiplexing transmission system comprising;
   a first relay node transmitting an optical signal from a first transmission path to a second transmission path, amplifying the optical signal with a fast optical amplifier and adjusting a light output intensity variance by a wavelength of the optical signal with a first gain tilt controller;
   a second relay node transmitting the optical signal received from the first relay node via the second transmission path to a third transmission path, amplifying the optical signal with a second optical amplifier and adjusting a light output intensity variance by a wavelength of the optical signal with a second gain tilt controller; and
   a control node setting values of light output intensity for each of the first optical amplifier and the second optical amplifier and setting values of gain tilt for each of the first gain tilt controller and the second gain tilt controller,
   wherein the control node calculates the values of light output intensity and gain tilt for each of the optical amplifiers and the gain tilt controllers so that a deviation of OSNR degradation caused by SRS can be rectified, and
   wherein the control node calculates the deviation based on sectional area as the first transmission path, the second transmission path, the third transmission path, an effective distance in which SRS occurs, and a Raman gain coefficient.

2. A wavelength division multiplexing transmission system of claim 1 further comprising:
   each the relay nodes has a demultiplexer for demultiplexing the optical signal into bands, pairs of the optical amplifier and the gain tilt controller for each band, and a multiplexer for multiplexing the bands of optical signal from pairs of the optical amplifier and the gain tilt controller, wherein the control node calculates the values of light output intensity and gain tilt for each of the optical amplifiers and the gain tilt controllers band by band so that a deviation of OSNR degradation caused by SRS can be rectified.

3. A wavelength division multiplexing transmission system of claim 1 wherein the control node sets values of light output intensity for each the optical amplifiers to adjust an average light output intensity of the optical signals for rectifying a deviation of OSNR degradation caused by SRS for band, and values of gain tilt for each of the gain tilt controllers to adjust a light output intensity variance by wavelength in the band for rectifying a deviation of OSNR degradation caused by SRS in band.

* * * * *